June 2, 1964   T. EDER   3,135,690
APPARATUS FOR SEPARATING LIQUID FROM A MIXTURE
OF GRANULAR MATERIAL AND LIQUID
Filed April 7, 1960   2 Sheets-Sheet 1
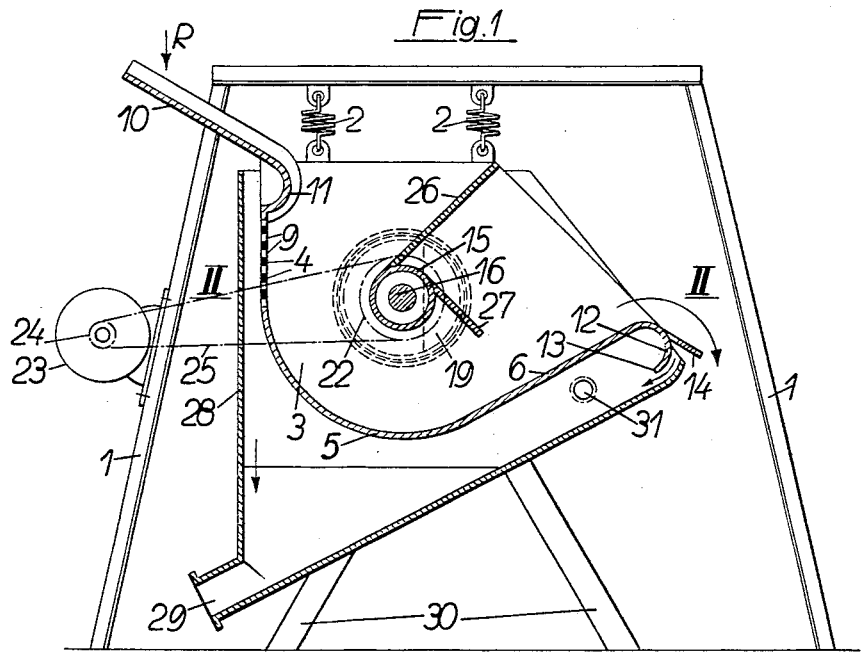
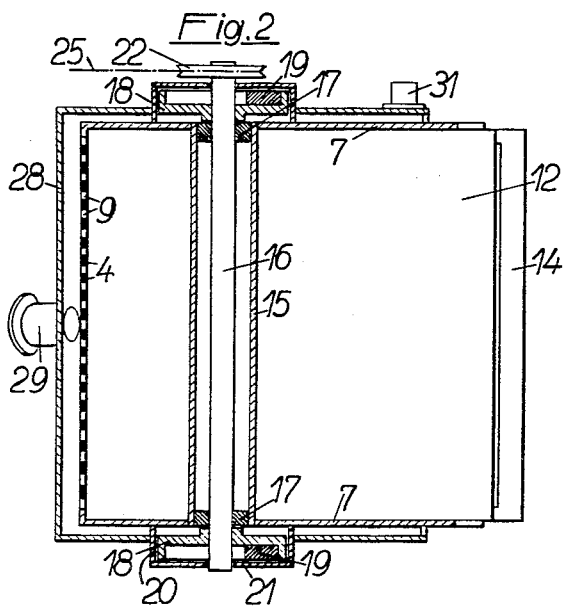
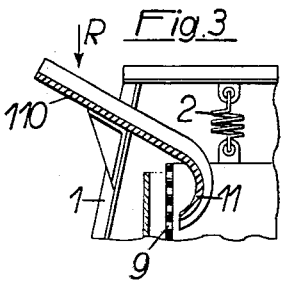
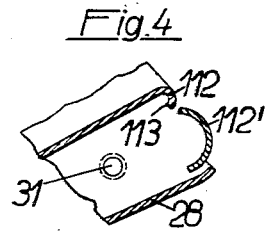

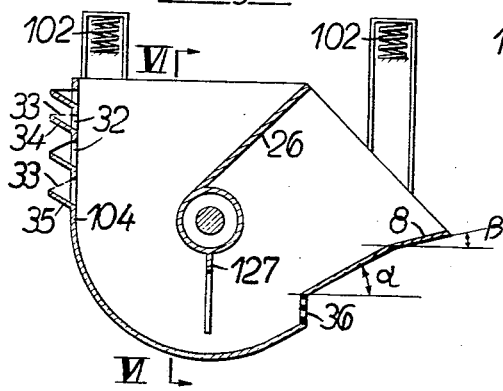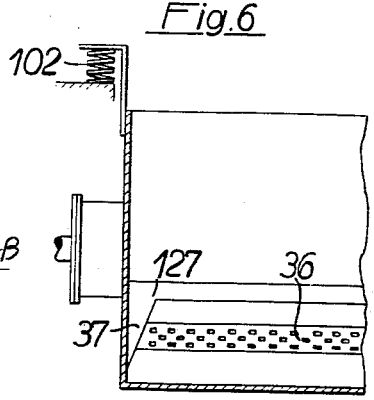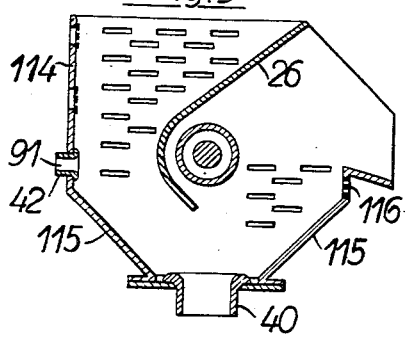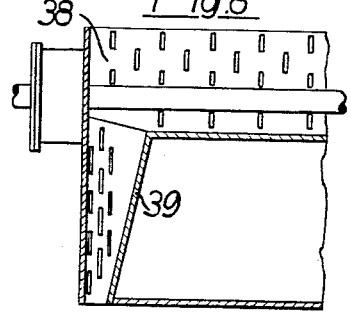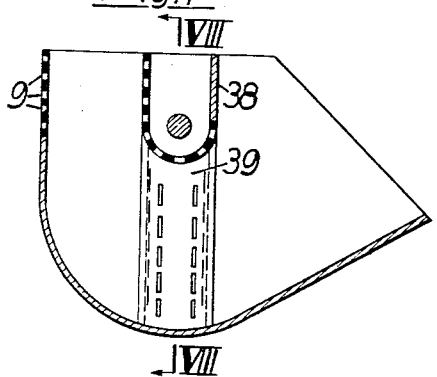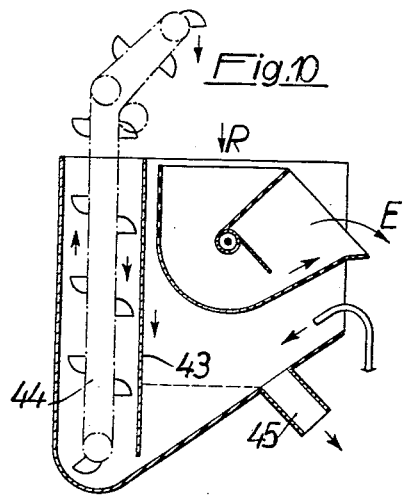

United States Patent Office 3,135,690
Patented June 2, 1964

3,135,690
APPARATUS FOR SEPARATING LIQUID FROM A MIXTURE OF GRANULAR MATERIAL AND LIQUID
Theodor Eder, Reisnerstrasse 32, Vienna III, Austria
Filed Apr. 7, 1960, Ser. No. 20,597
Claims priority, application Austria Apr. 24, 1959
3 Claims. (Cl. 210—389)

This invention relates to apparatus for separating liquid from mixtures of granular material and liquid, more particularly for dewatering fine sands, ores, or the like. The need for removing part of the liquid, consisting in most cases of water, from such mixtures, occurs in various fields, mainly where it is desired to directly obtain a specific ratio of the bulk density of the dewatered mixture to the granular solids content thereof, such as in classifying or sorting operations or in the production of high-grade concrete etc. having a constant water-cement ratio.

In these cases it is not essential to achieve a perfect drying but it is sufficient and highly advantageous to reduce the liquid content to a value which remains virtually constant and at which the liquid will no longer drip off.

In order to save space and time it has been attempted to obtain a partial separation between the solid and liquid phases of a wet mixture of granular solids by a dynamic method, consisting in vibrating the mixture, rather than by a static settling of the liquid.

It is an object of the invention to provide an apparatus which enables separation of the liquid from wet mixtures of granular solids, which mixtures consist at least in a part amounting to at least 10% of particles less than 1 mm. in diameter, with small expenditure and small labor costs to a final moisture content suitable for bin storage, and which can be carried out at satisfactory rates with small units. This object is achieved according to apparatus in which the wet material is vibrated and the material is conveyed while being vibrated from a feeding station to a lower discharge station, the conveying being assisted by maintaining a difference between the feed and discharge levels, while at least one change in the sign of the vertical component of the mean velocity of conveyance is effected and the separated liquid is continuously discharged at least from the upper layers of the vibrated material. It is of special advantage to provide for a continuous discharge of liquid which accumulates on the supporting wall.

It has proved desirable to withdraw part of the granular material together with the liquid. It will depend on the proportion of this part and on the price of the granular material whether it is worth while to concentrate the granular material separated with the liquid, to return the concentrated material to the feeding station for the wet material, and to reintroduce it there for a successive operation.

Apparatus in accordance with the invention comprises a resiliently suspended or supported trough, which is operatively connected to a vibrator and which is adapted for receiving wet material and for discharging granular material from which part of the liquid has been removed while also discharging the separated liquid. According to the invention the wall of this trough descends away from the wet material inlet adjacent thereto and ascends toward the outlet adjacent thereto, which outlet is formed by an overflow edge of the trough wall and disposed below the inlet, and the trough wall is provided at least on the inlet side with apertures in the areas adjoining the upper layers of the material being conveyed.

The trough may comprise a bottom, two substantially parallel side walls, a rear wall and a front wall. The front wall is disposed close to the inlet and extends substantially vertically. This front wall, which merges downwardly into the bottom, has apertures which are either distributed throughout this wall or in one or several zones. The bottom may be curved and consists preferably of a part of the peripheral surface of a circular cylinder. The rear wall, which extends from the bottom, may be flat. It will in any case ascend and should include with the horizontal an angle $\alpha$, which preferably exceeds 20°. Angles of approximately 30° have proved satisfactory. The free edge of the rear wall forms an overflow edge for the end product. In some cases it is suitable to form apertures in the rear wall and, if required, also in the side walls connected to the rear wall, as well as in the bottom and the front wall. These apertures are particularly desirable near the inlet. To ensure a smooth conveyance it is desirable to arrange the front wall, bottom and rear wall so that they merge smoothly into one another.

In dewatering it may be advantageous to provide the rear wall with one or more approximately vertical steps formed with apertures and/or to angle the rear wall close to the overflow edge so that the latter is adjoined by a narrow strip, having a width of, for example, 30 mm., which includes an angle $\beta$ between 5° and 20° with the horizontal. It has proved particularly desirable if the surfaces which support the material have at least one edge across which the material is conveyed at the wet material inlet or at the outlet and which constitutes at least one weir stage for deflecting the separated liquid towards the trough wall and deflecting solid particels away from said trough wall.

The apertures may consist of simple bores or may be horizontal or vertical slots, which may be arranged in rows and relatively staggered. It is also possible to provide larger windows, which are covered with an abrasion-resisting perforated fabric, such as, screens of wear-resisting steel, nylon or the like. Bores large in diameter may have nozzles of rubber, polyvinyl chloride or the like inserted therein to reduce the wear at the rims and if the inserts are replaceable the free area of the apertures can be selected in view of the mean particle diameter of the granular solids to be dewatered. Such an arrangement can also be achieved if the above-mentioned fabrics are replaceable. It may be desirable to use nozzles with extension sleeves, which have an outwardly tapering inside diameter.

Further features of the invention will become apparent from the detailed explanation of the invention with reference to illustrative embodiments diagrammatically shown in the accompanying drawings, in which:

FIG. 1 is a sectional view showing a dewatering apparatus according to the invention, FIG. 2 is a sectional view taken on line II—II of FIG. 1, FIGS. 3 and 4, respectively, show a modified design of the weirs at the feed and discharge zones, FIG. 5 shows a modified trough, FIG. 6 a sectional view taken on line VI—VI of FIG. 5, FIG. 7 is a sectional view of a third embodiment of a trough, FIG. 8 is a sectional view taken on line VIII—VIII of FIG. 7, FIG. 9 is a sectional view of another form of trough and, FIG. 10 a sectional view of a dewatering apparatus connected to a conveyor.

The dewatering apparatus shown in FIGS. 1 and 2 comprises a steel frame 1, from which a trough 3 is resiliently suspended by means of springs 2. This trough is defined by a front wall 4, a curved bottom portion 5, a rear wall 6 and two parallel side walls 7. The front wall is formed with apertures, which may be simple holes 9. That part of the rear wall which adjoins the overflow edge (FIG. 5) may be a flat narrow strip 8, which includes a smaller angle β with the horizontal than the remaining wall portion so that the length of the wall is increased without an undue rise of the level of the overflow edge.

It may be desirable to provide a rear wall which, as is shown in FIGS. 1 and 4, has a reversely bent outer portion, which curves back towards the rear wall from the outside and is shaped to form a bead 12. The edge 13 or 113 (FIG. 4) of this beadlike weir forms a dripping edge. Close to that point of the bead wall where the same begins to curve back towards the rear wall a baffle 14 (FIG. 1) connected to the trough is provided to permit the partly dewatered granular solids to be discharged. This baffle is spaced with a clearance from the bead surface. The top edge of the front wall has connected thereto a feed chute 10, the lower edge of which overlaps the transverse edge of the trough and curves back towards the front wall of the trough and is connected thereto close to the uppermost apertures, as for example, by welding, and forms a bead 11.

A tube 15 is provided which extends transversely through the trough and the rims of which are tightly sealed to the side walls 7. The cavity of this tube accommodates the shaft 16 of a vibrator, which shaft is carried in bearings 17. This shaft has at each end a pot-shaped disc 18, which carries a rotary unbalance member 19 in its cavity. The side walls 7 carry extensions 20 with cover plates 21 to protect the pot-shaped discs and the bearings of the shaft 16 from being soiled. One end of the shaft extends through an aperture in the associated cover disc and has a drive pulley 22 keyed thereto. The frame 1 carries a motor 23, to the shaft of which a belt pulley 24 is secured. A drive member such as a V-belt 25 extends around the two pulleys 22, 24. The tube 15 extending through the trough as well as the side walls carries baffles 26 and 27. Baffle 26, defines the inlet. Baffle 27, defines a passage with the rear wall and the side walls. The trough 3 is surrounded by an open-topped splash box 28, which may be connected to the frame or be carried by separate legs 30 and which tapers downwardly and has at its lower tip an outlet 29. A connection pipe 31 for supplying flushing water for cleaning purposes is connected to one of the two side walls of the splash box. It may be pointed out that it is not essential to provide a separate frame for suspending the trough and that, for example in stationary installations, the trough may be suspended from an existing structure or from the ceiling of a building. If the splash box is designed with sufficient strength, the trough may be resiliently suspended therefrom or supported thereon with springs.

The mode of operation of the above apparatus is as follows; The wet material to be dewatered is introduced at R onto the feed chute 10 of the apparatus. By means of the rotary unbalance members 19, to which rotation is imparted by the motor 23, the trough of the apparatus is subjected to vibration, which is transmitted to the wet material. This vibration causes a separation of the solid and liquid components of the mixture in such a manner that the liquid component, which has a lower specific gravity, migrates towards the surface. In the upper layers the material contained in the trough is thus enriched with liquid. This causes an accumulation of liquid above the charged material at the inlet and a formation of liquid layers on the trough walls. In the arrangement shown in FIGS. 1 and 2, in which the symmetrical design of the vibrator causes a vibratory movement in a direction which is substantially parallel to the longitudinal center plane of the trough, a liquid layer will mainly be formed on the substantially vertical front wall. The apertures in this wall permit of a continuous outflow of the layer with which the material has been enriched at the inlet or which has accumulated there or has been separated in layers. This liquid is thus removed from wet material. Dependent upon the liquid content of the wet material it may be desirable to form apertures also in the rear wall close to the outlet. Particularly in the case of treatment of very wet mixtures of granular solids and liquids or where the vibration is not parallel to the longitudinal center plane owing to a lack of symmetry it may prove desirable to provide holes, slots or the like also in the side walls, preferably adjacent the inlet. The liquid contents of the wet material and/or the composition of its granular solids may be such as to cause liquid to settle out on the chute so that the material sliding on the bottom of the chute towards the trough is enriched with liquid close to the bottom and has a more friable consistency in the upper layers. If this mixture falls into the trough over the bead, a separation takes place inasmuch as that part having the highest liquid content is guided along the bead surface close to the front wall of the trough whereas the drier material drops into the trough at a distance from the front wall. It is desirable to guide the liquid-enriched part of the mixture close to the apertures in the front wall of the trough. For this purpose the bead 11 is provided and constitutes a guide means. According to the invention the inlet edge is thus designed as a weir to prevent liquid which has already been separated from mixing again with drier granular material, from which it would then have to be separated again.

The vibration imparted to the wet granular mixture does not only cause a local accumulation of liquid but also increases the fluidity of the pulpy mixture so that the same is capable of flowing. The vibratory path of the trough is an ellipse. Depending on the direction in which the vibratory path extends, the vibratory movement will result in a conveying action in the direction from the inlet to the outlet or in the opposite direction. In the first case any difference which is maintained between the level of the inlet and the lower outlet will promote the conveyance because the mixture which has been rendered fluid by the vibration will respond to the influence of a hydrostatic pressure. In the second case the difference between the levels must be sufficient to cause a conveyance against the conveying effect of the vibration. It will be appreciated that the trough will be designed to promote the conveyance in the desired direction. The individual paths followed by each particle as it is being conveyed cannot be defined. The conveyance must be considered a statistical process. In that case a mean path can be associated with each particle and this path will be approximately U-shaped at least for the great majority of the particles.

The mean velocity of conveyance close to the inlet has a downwardly directed vertical component and at a location before the outlet has an upwardly directed vertical component so that the sign of the vertical component is changed at least once. The wet material charged will move from the inlet to the outlet and during its conveyance a large part of its liquid contents is separated and discharged suitably close to the inlet and considerably demoistened granular material approaches the outlet.

It may be mentioned that the feed chute need not be connected to the trough but as shown in FIG. 3 for the chute 110, with the bead 111, may be independent of the trough and be connected to the frame. The provision of a feed chute is not essential for a satisfactory function of the apparatus according to the invention.

Adjacent the outlet a liquid-enriched layer may also form close to the rear wall of the trough. With the aid of the outlet edge which is designed according to the invention as a weir at least part of this liquid may be separated. Owing to its low liquid content the granular material above this layer will separate into lumps as it moves beyond the highest position reached during its conveyance and these lumps will move across the gap between the edge bead 12 and the baffle 14 onto the latter and will be discharged. The liquid will run along the surface of the bead and drip from its lower edge 13. This design of the outlet therefore enables additional removal of liquid, which is thus eliminated from the end product.

In a multistage weir, e.g., one having two stages, as shown in FIG. 4 the liquid-enriched fluid material will also be disposed on the surface of the bead 112 and will slide along the same through the gap into the splash box. The drier material moves across the gap onto the adjacent bead 112' and any liquid parts of the mixture which have been entrained will remain on the bead wall and moving over the surface will enter the gap before the edge of the splash box and from the lower edge of the bead into the interior of the box. The granular material from which the liquid has been substantially removed rolls across the gap and the edge and is discharged.

FIGS. 5 to 6 show substantially only the trough of another embodiment of the invention. This trough is arranged to be resiliently supported by springs 102, which are carried by a fixed support, such as, a separate frame or an existing frame or a building. The apertures in the front wall 104 are transverse windows 32, before which tublike struck-out portions 34 and 35 are arranged on the outside. The projection of these struck-out portions onto the wall may extend over the entire window opening or part thereof, as is shown at 34 and 35. The rear wall has a step 36 with apertures consisting of rows of holes. The trough includes baffles 26, 127, the latter having a substantially trapezoidal aperture.

In such troughs the conveyance and the separation of liquid and of granular solids are also effected in the manner described. The window openings 32 with the struck-out tubs form larger discharge cross-sections and at the same time an angled passage for the discharge of the liquid. This will at least reduce the undesired loss of granular material discharged with the liquid because solid particles will be retained in the tub at least for some time and will form a filter layer, which obstructs the movement of further solid particles. This effect can be intensified if the open top of the tubs is covered with perforated plates, screens 33 or the like. The opening defined by the baffle or orifice member 127 does not extend as far as to the side walls. The lateral marginal portions 37 of the orifice member cause liquid to build up in any liquid layers which may have been formed on the side walls. Liquid which has settled out adjacent to the rear wall is discharged through the apertures in the substantially vertical section 36. That portion of the rear wall which adjoins the overflow edge has the form of a narrow, flat strip 8, which includes with the horizontal a smaller angle β than the remaining wall portion and which increases the length of the wall without an undue rise of the level of the overflow edge.

The trough which is shown in FIGS. 7 and 8 has a guide body 38 which is connected to the side walls and which defines a duct, which may be closed on all sides and the outside surface of which constitutes a baffle and forms a part of the trough wall. That part of the duct wall which faces the front wall of the trough and the bottom is provided with apertures, which may have the form of slots. At each of the ends of the duct a discharge passage is provided which is partly defined by the respective side wall and partly by a shell 39 preferably welded to said side wall. The two shells are provided with slot-like apertures at least in those surfaces which face the front wall of the trough and which together with the duct wall define a trapezoidal passage opening.

In such a trough the dewatering takes place through the apertures in the front wall into the duct and the two discharge passages, the openings of which enable a discharge also of the liquid which has been separated in the form of layers on the side walls. Liquid which has been separated on the rear wall of the duct can also escape through the holes disposed there. It is possible, of course, to provide additional discharge openings at other points of the trough wall. The conveyance of the material is similar to that described hereinbefore.

The trough according to FIG. 9 has a vertical front wall 114, to which the bottom 115, is attached at an angle. This bottom is continued by a short rear wall 116 extending at an angle to the adjoining part of the bottom wall. The bottom of the trough may be formed with an aperture in which a preferably replaceable nozzle 40 is inserted, which determines the outlet cross-section. Replaceable orifice plates or a slide valve may also serve for adjusting the outlet cross-section. A baffle wall 26 defines the inlet. In such troughs the liquid separated at the inclined walls of the bottom is separated through the nozzle orifice together with part of the granular material. This orifice may be dimensioned to ensure the removal of a large part of the liquid whereas the entrained part of the granular solids is not excessive. The apertures in the front wall consist partly of woven fabric-covered windows and partly of bores provided with nozzles 91 of resilient material. The nozzles have a sleeve-shaped extension 42, the inside diameter of which may taper, particularly in the outward direction. Such nozzles do not only serve to define predetermined cross-sections but as they consist of resiliently deformable material, such as rubber, permit also a temporary retention of solid particles, which are clamped and form a filter for the liquid to be eliminated. In this way an undesired entrainment of granular material is prevented. Any liquid which is separated on the rear side of the baffle wall slides along this wall downwardly and remains substantially on the upper layers of the material which is being conveyed. This liquid may be discharged through the apertures in the side walls without having been mixed entirely with the material again. These apertures may be arranged to ensure that at least a major part of the liquid is discharged.

If the granular material discharged together with the separated liquid in apparatus according to the invention exceeds intentionally or unintentionally a tolerable amount, this part can be returned to the separating process. This mode of the separating process may be carried out, e.g., in apparatus as shown in FIG. 10, which is provided with a trough surrounded by a splash box. In the box a partition 43 is provided with clearance at the bottom of the box. One of the box compartments thus defined by the partition contains the trough, the other one contains a conveyor 44. The liquid discharged by the trough along with any entrained granular material enters the splash box. The solid particles subside and slide along the inclined bottom of the box through the clearance defined by the partition 43 to the lowermost point of the box, where the particles are received by the buckets of the conveyor consisting, for example, of a bucket elevator and are raised and discharged into the inlet of the trough. The bucket walls may be formed with apertures to enable liquid which has also been received to flow out. The liquid accumulating over the subsided solid particles escapes through a connection pipe 45 attached to the wall of the splash box.

It is obvious that the apparatus for concentrating and the elevator need not be connected to the splash box but separate devices of this kind, such as pointed tubes or similar concentrators on the one hand and pulp pumps or the like on the other hand, can be used if it is desired to return granular material which has been discharged together with the liquid.

It may also be mentioned that the form and arrangement of the apertures in the trough wall as described with reference to the various embodiments is not only applicable to the respective embodiment but also to the other embodiments.

The following example is representative of the operation of the device in terms of the separation properties thereof.

Example

A wet sand which contained 36% water was charged at a rate of 28 metric tons per hour, corresponding to 18 tons of granular solids having 0.1–0.6 mm. in diameter and 10 cubic meters water per hour, into a trough 500 mm. long and wide. The vibrator connected to the trough and comprising rotary unbalance members was driven at 1500 revolutions per minute. The major axis of the vibration ellipse passed through in a conveying sense was about 1 centimeter. The rear wall was inclined by an angle of 25° against the horizontal. The demoistened end product free of dripping water which was discharged consisted of 17 metric tons per hour of sand and 2.3 cubic meters per hour of water, i.e., 19.3 metric tons per hour of a sand-water mixture having a water content of 12%. 1 metric ton per hour of sand mixed with 7.7 cubic meters per hour of water are discharged through the apertures of the trough. This throughput was achieved with means effective difference of about 5 mm. between the inlet and outlet levels. The mean velocity of conveyance of the material was about 10 centimeters per second. If the angle between the rear wall and the horizontal was reduced to 10° the velocity of conveyance dropped to about 1 centimeter per second and the output was correspondingly reduced.

I claim:

1. Apparatus for separating liquid from mixtures of granular material and liquid, said apparatus comprising a trough, means resiliently supporting the trough, said trough having an inlet, said trough comprising two substantially parallel side walls, a substantially vertical front wall, a curved bottom wall, said front wall merging into said bottom wall, a substantially flat rear wall merging with said bottom wall and extending upwardly therefrom, said front wall having a portion provided with apertures therein adjacent the inlet to allow liquid discharge therethrough, said bottom and rear walls being imperforate, means associated with the inlet to guide at least a portion of the mixture onto the portion of the front wall having the apertures whereby some of the liquid is discharged through the apertures, said rear wall having a curved extremity remote from said bottom wall forming an outlet, means adjacent said outlet for separately discharging granular material while allowing the liquid to flow over said curved extremity, a tube shaped member extending transversely through said trough substantially perpendicular to said side walls, said tube shaped member together with said walls of the trough defining a nonlinear passageway with a descending inlet zone and an ascending outlet zone, said outlet being disposed at a lower level than said inlet, said apparatus further comprising a vibrator operatively connected to said trough and adapted to generate vibrations with at least a component which is perpendicular to said front wall.

2. Apparatus according to claim 1 comprising baffle means which extends from said tube shaped member in upward direction and which defines with said front wall a zone adjacent the inlet which is funnel shaped.

3. Apparatus according to claim 1 wherein said vibrator comprises a shaft mounted for rotation within said tube shaped member and at least one rotary unbalance member on said shaft and, means to rotate said shaft.

References Cited in the file of this patent

UNITED STATES PATENTS

| | | |
|---|---|---|
| 329,210 | Quimby | Oct. 27, 1885 |
| 1,607,013 | Meyerhoffer | Nov. 16, 1926 |
| 1,986,897 | Shaw | Jan. 8, 1935 |
| 2,183,896 | Rupp et al. | Dec. 19, 1939 |
| 2,222,777 | Linke | Nov. 26, 1940 |
| 2,505,513 | Young et al. | Apr. 25, 1950 |
| 2,799,398 | Heymann | July 16, 1957 |
| 2,982,411 | Fontein | May 2, 1961 |